United States Patent
Toledano

(10) Patent No.: US 10,061,677 B2
(45) Date of Patent: Aug. 28, 2018

(54) FAST AUTOMATED DETECTION OF SEASONAL PATTERNS IN TIME SERIES DATA WITHOUT PRIOR KNOWLEDGE OF SEASONAL PERIODICITY

(71) Applicant: Anodot Ltd., Ra'anana (IL)

(72) Inventor: Meir Toledano, Tel Aviv (IL)

(73) Assignee: Anodot Ltd., Ra'anana (IL)

(*) Notice: Subject to any disclaimer, the term of this patent is extended or adjusted under 35 U.S.C. 154(b) by 151 days.

(21) Appl. No.: 15/353,709

(22) Filed: Nov. 16, 2016

(65) Prior Publication Data

US 2018/0136994 A1 May 17, 2018

(51) Int. Cl.
| | |
|---|---|
| G06F 11/30 | (2006.01) |
| G06F 11/32 | (2006.01) |
| G06F 11/34 | (2006.01) |
| G06F 11/07 | (2006.01) |

(52) U.S. Cl.
CPC ........ G06F 11/3072 (2013.01); G06F 11/079 (2013.01); G06F 11/321 (2013.01); G06F 11/322 (2013.01); G06F 11/327 (2013.01); G06F 11/3428 (2013.01); G06F 11/0721 (2013.01)

(58) Field of Classification Search
CPC .. G06F 11/3072; G06F 11/321; G06F 11/322; G06F 11/327; G06F 11/3428; G06F 11/079; G06F 11/0721
See application file for complete search history.

(56) References Cited

U.S. PATENT DOCUMENTS

| | | | |
|---|---|---|---|
| 9,356,846 B2* | 5/2016 | Cremonesi | G06Q 10/06 |
| 2014/0108324 A1* | 4/2014 | Chen | G06F 17/18 706/52 |
| 2016/0147583 A1 | 5/2016 | Simhon et al. | |
| 2016/0210556 A1 | 7/2016 | Simhon et al. | |
| 2016/0269762 A1 | 9/2016 | Inoue et al. | |

OTHER PUBLICATIONS

International Search Report and Written Opinion for PCT Application No. PCT/IB17/57191, dated Apr. 25, 2018, 8 pages.
Schlichthärle, D.; Digital Filters Basics and Design, 2nd Edition; 2011; 544 pages.
Pisarenko, V.F.; The Retrieval of Harmonics from a Covariance Function; Jan. 29, 1973; 20 pages.

\* cited by examiner

*Primary Examiner* — Paul Contino
(74) *Attorney, Agent, or Firm* — Harness, Dickey & Pierce, P.L.C.

(57) ABSTRACT

A processing system receives a time series of values of a first metric corresponding to computing system performance. A computation module calculates an autocorrelation function (ACF) based on the time series of values across a set of values of tau. The spacing between each consecutive pair of values in the set of values of tau increases as tau increases. A local maxima extraction module identifies local maxima of the calculated ACF. A period determination module determines a significant period based on spacing between the local maxima and selectively outputs the significant period as a periodicity profile. A baseline profile indicating normal behavior of the first metric is generated based on the periodicity profile. An anomaly identification module selectively identifies an anomaly in present values of the first metric in response to the present values deviating outside the baseline profile.

16 Claims, 13 Drawing Sheets

FAST AUTOMATED DETECTION OF SEASONAL PATTERNS IN TIME SERIES DATA WITHOUT PRIOR KNOWLEDGE OF SEASONAL PERIODICITY

FIELD

The present disclosure relates to automated analysis of observed metrics and more particularly to computerized determination of expected metric performance.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Modest computing systems can have hundreds or even thousands of processor cores, memory arrays, storage arrays, networking ports and additional peripherals. In large-scale computing systems such as a data center or supercomputer, the number of processor cores can be in the hundreds of thousands to millions. Each hardware component may have a number of associated parameters such as clock speed, temperature, idle time, etc. Some of these parameters may be reported and/or measured by the computing system itself. Other parameters may be monitored by an associated monitoring system.

These parameters are referred to in this disclosure as metrics and may be defined at a component level such as available space on a given magnetic disk or may be at a subsystem level such as amount of available storage space in a storage area network. Metrics may also be defined at a system level, such as number of transactions per second in the data base, delay in returning results for a query, or the length of execution time of a particular function. A monitoring system for a large computing system may measure and/or collect thousands, millions, or even billions of time-series (that is, the metrics are measured over time) metrics. Monitoring metrics allows for problems to be quickly identified and resolved, hopefully before problems negatively affect business outcomes such as alienating users, missing revenue, decreasing productivity, etc.

Currently, problems are detected by skilled system administrators who manually create rules to generate alerts for specific metrics. For example, an administrator may set a threshold for available disk space such that an alert will be generated when available disk space decreases below 10% of total disk space. For many metrics, the "correct" threshold may not be known a priori. Instead, the administrator may have to observe the metric over time and infer a threshold based on the historical metric values.

Administrators may watch scores of metrics, such as in a dashboard, and use experience and intuition to determine if any of the metrics indicate the onset of a problem. However, regardless of how many computer screens are used, the number of metrics that can be visually tracked is limited.

Because of the limitations of visual and programmatic oversight by human administrators, big data principles have been applied to the problem of monitoring systems. Automated processes may evaluate every single metric, a significant advance compared to the tiny fraction that a human administrator can review, and determine normal historical behavior for each metric.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A processing system includes an input device configured to receive a time series of values of a first metric. The first metric corresponds to a measurement of computing system performance. The processing system includes a seasonal trend identification module configured to determine a periodicity profile for the first metric based on the time series of values. The seasonal trend identification module includes a computation module configured to calculate an autocorrelation function (ACF) based on the time series of values across a set of values of tau. The spacing between each consecutive pair of values in the set of values of tau increases as tau increases. The seasonal trend identification module includes a local maxima extraction module configured to identify local maxima of the calculated ACF. The seasonal trend identification module includes a period determination module configured to determine a significant period based on spacing between the local maxima and selectively output the significant period as the periodicity profile. The processing system includes a normal behavior characterization module configured to generate a baseline profile indicating normal behavior of the first metric based on the time series of values and the periodicity profile. The processing system includes an anomaly identification module configured to selectively identify an anomaly in present values of the first metric in response to the present values deviating outside the baseline profile. The processing system includes an alert module configured to generate an alert message in response to the identified anomaly and transmit the alert message to a designated user over a network interface.

In other features, the processing system includes an anomaly behavior characterization module and an anomaly scoring module. The anomaly behavior characterization module is configured to (i) analyze a plurality of prior anomalies present in the time series of values and (ii) develop an anomaly model of the first metric based on the analysis of the prior anomalies. The anomaly scoring module is configured to determine a first score for the identified anomaly based on (i) characteristics of the identified anomaly and (ii) the anomaly model, The alert module is configured to generate the alert message only in response to the first score exceeding a threshold. In other features, the anomaly scoring module is configured to determine the first score further based on data of contemporary anomalies for metrics other than the first metric.

In other features, the seasonal trend identification module includes a preprocessor configured to interpolate and detrend the time series of values prior to calculation of the ACF. In other features, the seasonal trend identification module includes a filter module configured to filter the time series of values prior to calculation of the ACF. In other features, the filter module is configured to generate a plurality of filtered data sets. Each of the filtered data sets corresponds to a different bandpass filter. In other features, the seasonal trend identification module includes an output device configured to output the periodicity profile based on a lowest significant period across the plurality of filtered data sets.

In other features, the spacing between each consecutive pair of values of tau monotonically increases as tau increases. In other features, the spacing between each consecutive pair of values of tau increases geometrically as tau increases. In other features, the local maxima extraction module is configured to split the ACF into segments using a threshold function. Each segment of the segments (i) has endpoints at points where the ACF is equal to the threshold function and (ii) at all other points the ACF is greater than the threshold function. The local maxima extraction module is further configured to identify, for each segment of the segments, a global maximum of the segment as a local maximum of the ACF.

In other features, the seasonal trend identification module includes a clustering module configured to calculate a difference in tau between each consecutive pair of local maxima, identify clusters of the differences, and count occurrences of the differences in each cluster. The period determination module is configured to selectively output the difference corresponding to the one of the clusters having the highest occurrence count. In other features, the period determination module is configured to compare the highest occurrence count to a threshold. The period determination module is configured to, in response to the highest occurrence count exceeding the threshold, indicate that the difference corresponding to the highest occurrence count is the significant period. The period determination module is configured to, in response to the highest occurrence count failing to exceed the threshold, indicate that no significant period is present.

A processing system includes an input device configured to receive a time series of values of a first metric. The first metric corresponds to a measurement of computing system performance. The processing system includes a seasonal trend identification module configured to determine a periodicity profile for the first metric based on the time series of values. The seasonal trend identification module includes a preprocessor configured to interpolate and detrend the time series of values to create processed data. The seasonal trend identification module includes a filter module configured to generate a plurality of filtered data sets, including a first filtered data set, by filtering the processed data. Each of the filtered data sets corresponds to a different bandpass filter. The seasonal trend identification module includes a computation module configured to calculate an autocorrelation function (ACF) for the first filtered data set across a set of values of tau. The spacing between each consecutive pair of values of tau increases geometrically. The seasonal trend identification module includes a local maxima extraction module configured to split the ACF into segments using a threshold function. Each segment of the segments has (i) endpoints at points where the ACF is equal to the threshold function and (ii) at all other points the ACF is greater than the threshold function. The local maxima extraction module is configured to identify, for each segment of the segments, a global maximum of the segment as a local maximum of the ACF. The seasonal trend identification module includes a clustering module configured to calculate a difference in tau between each consecutive pair of local maxima, identify clusters of the differences, and count occurrences of the differences in each cluster. The seasonal trend identification module includes a period determination module configured to identify which of the clusters has a highest occurrence count, compare the highest occurrence count to a threshold, in response to the highest occurrence count exceeding the threshold, indicate that the difference corresponding to the highest occurrence count is a significant period, and, in response to the highest occurrence count failing to exceed the threshold, indicate that no significant period is present. The seasonal trend identification module includes an output device configured to output the periodicity profile based on (i) the significant period and (ii) significant periods for others of the plurality of filtered data sets. The processing system includes a normal behavior characterization module configured to generate a baseline profile indicating normal behavior of the first metric based on the time series of values and the periodicity profile. The processing system includes an anomaly behavior characterization module configured to (i) analyze a plurality of prior anomalies present in the time series of values and (ii) develop an anomaly model of the first metric based on the analysis of the prior anomalies. The processing system includes an anomaly identification module configured to selectively identify an anomaly in present values of the first metric in response to the present values deviating outside the baseline profile. The processing system includes an anomaly scoring module configured to determine a first score for the identified anomaly based on (i) characteristics of the identified anomaly, (ii) the anomaly model, and (iii) data of contemporary anomalies for metrics other than the first metric. The processing system includes an alert module configured to, in response to the first score exceeding a threshold, generate an alert message and transmit the alert message to a designated user over a network interface. In other features, the computing system performance is one of processor usage, memory usage, execution time, simultaneous connections, and network latency.

In other features, the anomaly behavior characterization module is configured to distinguish, based on user feedback, at least one of (i) anomalies representing false positives and (ii) anomalies representing true positives. The anomaly behavior characterization module is configured to at least one of (i) decrease contributions to the anomaly model from anomalies representing true positives compared to other anomalies and (ii) increase contributions to the anomaly model from anomalies representing false positives compared to other anomalies.

A method of recognizing an anomaly in time series data includes receiving a time series of values of a first metric. The first metric corresponds to a measurement of computing system performance. The method includes calculating an autocorrelation function (ACF) based on the time series of values across a set of values of tau. The spacing between each consecutive pair of values in the set of values of tau increases as tau increases.

The method includes identifying local maxima of the calculated ACF. The method includes determining a significant period based on spacing between the local maxima. The method includes selectively outputting the significant period as a periodicity profile. The method includes generating a baseline profile indicating normal behavior of the first metric based on the time series of values and the periodicity profile. The method includes selectively identifying an anomaly in present values of the first metric in response to the present values deviating outside the baseline profile. The method includes generating an alert message in response to the identified anomaly. The method includes transmitting the alert message to a designated user over a network interface.

In other features, the method includes analyzing a plurality of prior anomalies present in the time series of values, developing an anomaly model of the first metric based on the analysis of the prior anomalies, determining a first score for the identified anomaly based on (i) characteristics of the identified anomaly and (ii) the anomaly model, and the alert message is generated only in response to the first score exceeding a threshold. In other features, the method includes generating a plurality of filtered data sets. Each of the filtered data sets corresponds to a different bandpass filter, and, for each of the plurality of filtered data sets, performing the calculating the ACF, the identifying the local maxima, and the determining the significant period. The method includes outputting the periodicity profile based on a lowest significant period across the plurality of filtered data sets.

In other features, the spacing between each consecutive pair of values of tau increases geometrically as tau increases. In other features, the identifying the local maxima includes splitting the ACF into segments using a threshold function. Each segment of the segments (i) has endpoints at points where the ACF is equal to the threshold function and (ii) at all other points the ACF is greater than the threshold function. The identifying the local maxima includes identifying, for each segment of the segments, a global maximum of the segment as a local maximum of the ACF.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

When establishing a normal baseline for a metric, from which anomalies can be detected, recognizing the periodic nature of the metric will allow for a more detailed and accurate baseline to be created. For example, an increase in a corporation's network activity from Sunday to Monday may represent a weekly cycle rather than a large anomaly. Without recognizing periodicity, the baseline would need to have an uncertainty large enough to allow for a large deviation from day to day. This may increase the risk that an actual anomaly will not be detected.

Graphical Introduction

Figure 1:
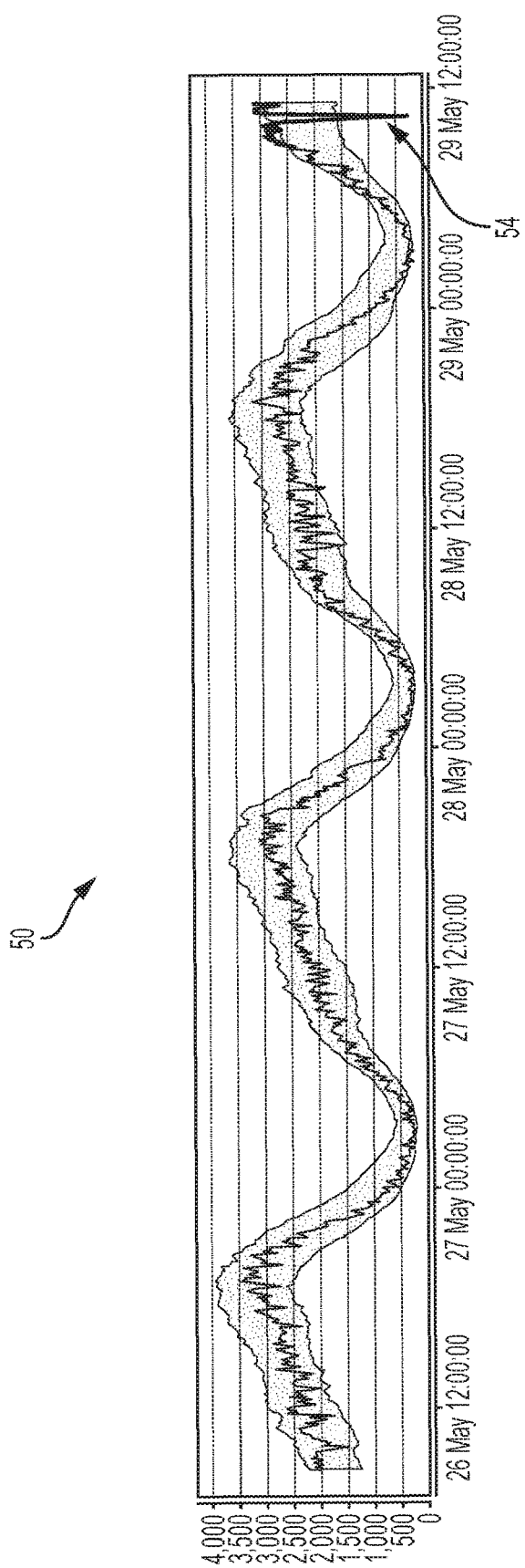
FIG. 1 is a graphical depiction of example elements in a monitored system and the corresponding monitoring system.

For example, FIG. 1 shows an example trace 50 of a metric representing web server activity over time. For example, the trace 50 may depict a number of active web sessions being handled by a physical or virtualized web server. Over the time span shown in FIG. 1, normal activity for this metric varies between approximately 500 active sessions and 3,500 active sessions. Therefore, an anomaly indicated at 54 remains within this range and may not be detected.

However, if the periodic nature of the trace 50 is recognized, then the expected normal values of the metric can be more tightly constrained according to the period. As a result, the excursion at 150, while within the range of normal values across time, is a clear deviation from the periodicity of the signal. By recognizing the periodic nature of the metric, the anomaly can be detected, reported, and potentially acted upon without requiring the expertise and labor-intensive review of the metric by an operator.

This may allow anomalies to be identified more quickly before they result in problems and may allow anomalies previously unrecognized to be diagnosed. For example, in various cloud posting environments, overloading of replication servers or on networking equipment has led to downtime events. With anomaly detection as described in the present application, smaller anomalies that do not lead to downtime events may be identified and their root causes explored before a particularly severe anomaly leads to a downtime event.

Frequency domain analysis, and particularly the Fourier transform, are often used to identify periodicity in a signal. When that signal is discrete sampled data, the discrete Fourier transform (DFT) is used. However, the DFT is a linear function, meaning that noise present in the signal will also show up in the frequency domain signal calculated by the DFT.

Figure 2:
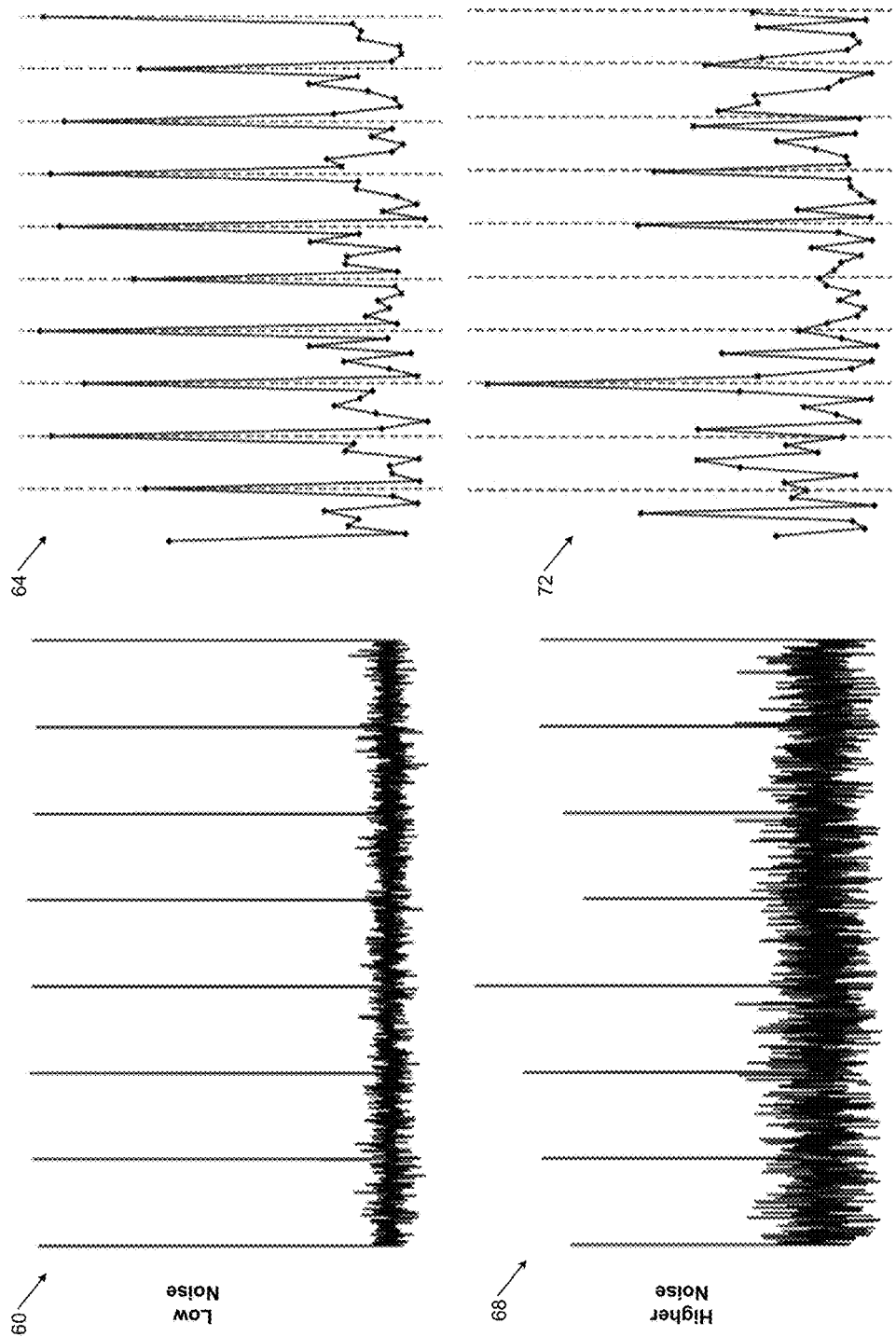
FIG. 2 is a plot of example values of a metric over time.

For example, see FIG. 2, in which an example trace 60 of a periodic signal is shown. A trace 64 of the DFT of the trace 60 shows harmonics at multiples of the fundamental frequency of the time series data 60. The relatively low amount of noise present in the time domain's data 60 is reflected in the relatively low amount of noise in the DFT trace 64.

However, if the amount of noise increases, such as is shown by example time domain trace 68, a corresponding DFT trace 72 no longer clearly shows the sequence of harmonics, which should line up with the dashed vertical lines. In fact, the DFT trace 72 does not even have a visible peak at the fundamental frequency. Note that while the amount of noise is higher in the trace 68, the signal-to-noise ratio is still relatively good, such that a visual analysis clearly indicates the strong periodicity. In other words, an increase in the noise floor—even one that does not obscure the time domain data—can result in disproportionate difficulties in the frequency domain.

Figure 3:
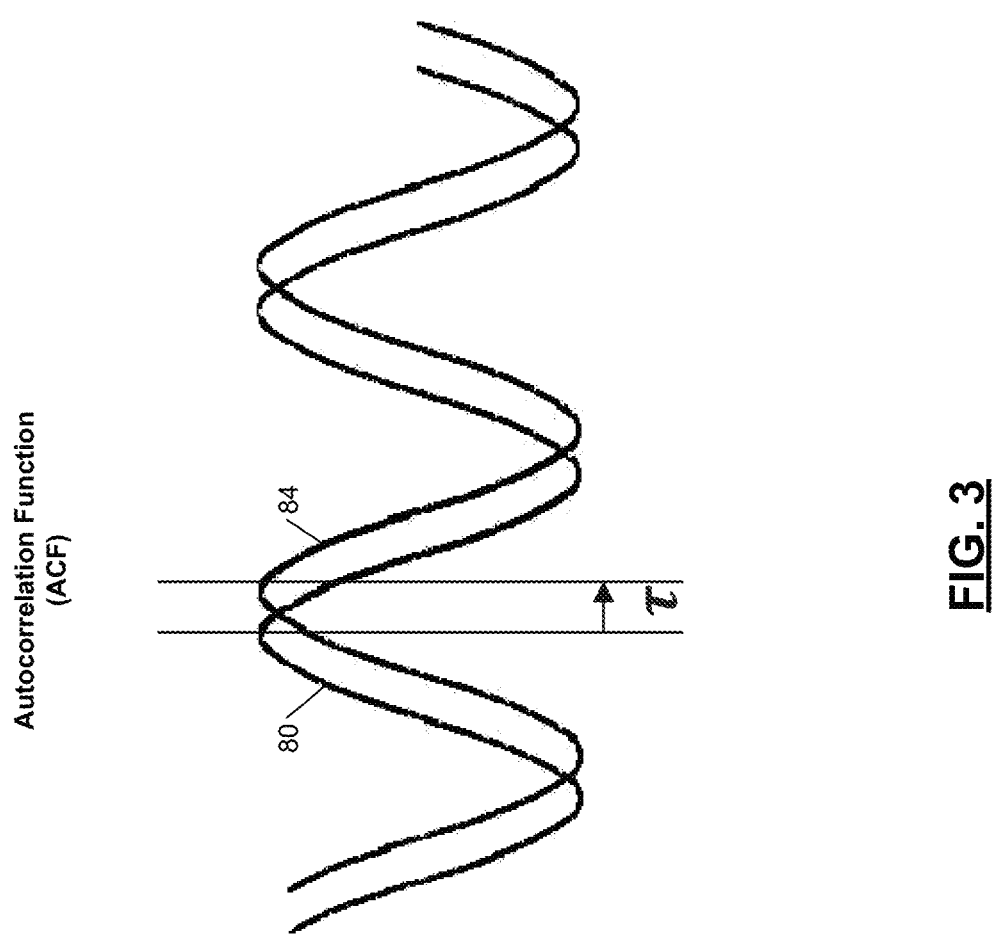
FIG. 3 is a pair of plots of time domain signals in the presence of lower and higher levels of noise accompanied by a pair of plots of corresponding frequency domain signals.

To address some of these issues, an autocorrelation function (ACF) is sometimes used. For example, in FIG. 3, a signal 80 is time shifted by an amount t, which results in trace 84. Calculating the correlation coefficient between the traces 80 and 84 establishes a value of the ACF for that value of t. For random noise, the ACF at all non-zero values of t is zero. Therefore, the ACF rejects noise and anomalies. The ACF is also more robust to missing samples in the input data.

Further, while the ACF may identify a multiple of the fundamental frequency as the periodicity, this is less problematic than when a frequency-domain analysis identifies a harmonic instead of the fundamental frequency. With the DFT, the harmonics are multiples of the frequency, leading to misidentification of a higher-than-actual frequency. Advantageously, with the ACF, the observed multiples are multiples of the period. As a result, a period twice as long (that is, half the frequency) of the actual period is determined. While not optimal, identifying a doubled period, as with the ACF, is far preferable to a doubled frequency, as with the DFT. This makes the ACF more robust to mistakes in algorithms.

For at least the above reasons, the ACF also allows for identification of low frequency patterns in the presence of high frequency repetition. In the description below, the present disclosure is developed for a time span of periodic patterns with a period of between approximately one hour and one week. However, the present disclosure can be applied to any other periods of time for which sampled data is available.

While the DFT is computationally fast, executing in $O(N \cdot \log(N))$, the ACF requires $O(N^2)$ processing time. On large data sets, calculation of the ACF may therefore be practically impossible. As described in more detail below, the ACF can be sampled at non-linear increments. For example, given a metric sampled once per second, the autocorrelation function could be evaluated with a one-second offset, a two-second offset, etc., all the way to the full length of the input time series. The difference between evaluating the ACF at 30 seconds and 31 seconds is much more statistically significant than the difference between evaluating the ACF at one week and one week plus one second.

In other words, for larger values of the ACF, larger increments can be used between the evaluated values. For example, geometric sampling may be used so that the differences between the evaluated ACF values are proportional to the absolute values being evaluated. Evaluating the ACF with constant increments is very costly in terms of processing time as well as memory storage even for a single metric. When analyzing orders of magnitude more metrics, such as millions of metrics, constant increments may be completely infeasible. While increased memory size may allow for reduced processing time, using non-linear sampling of the ACF will allow for a reduction in one or both of memory footprint and processing time.

System Overview

Figure 4:
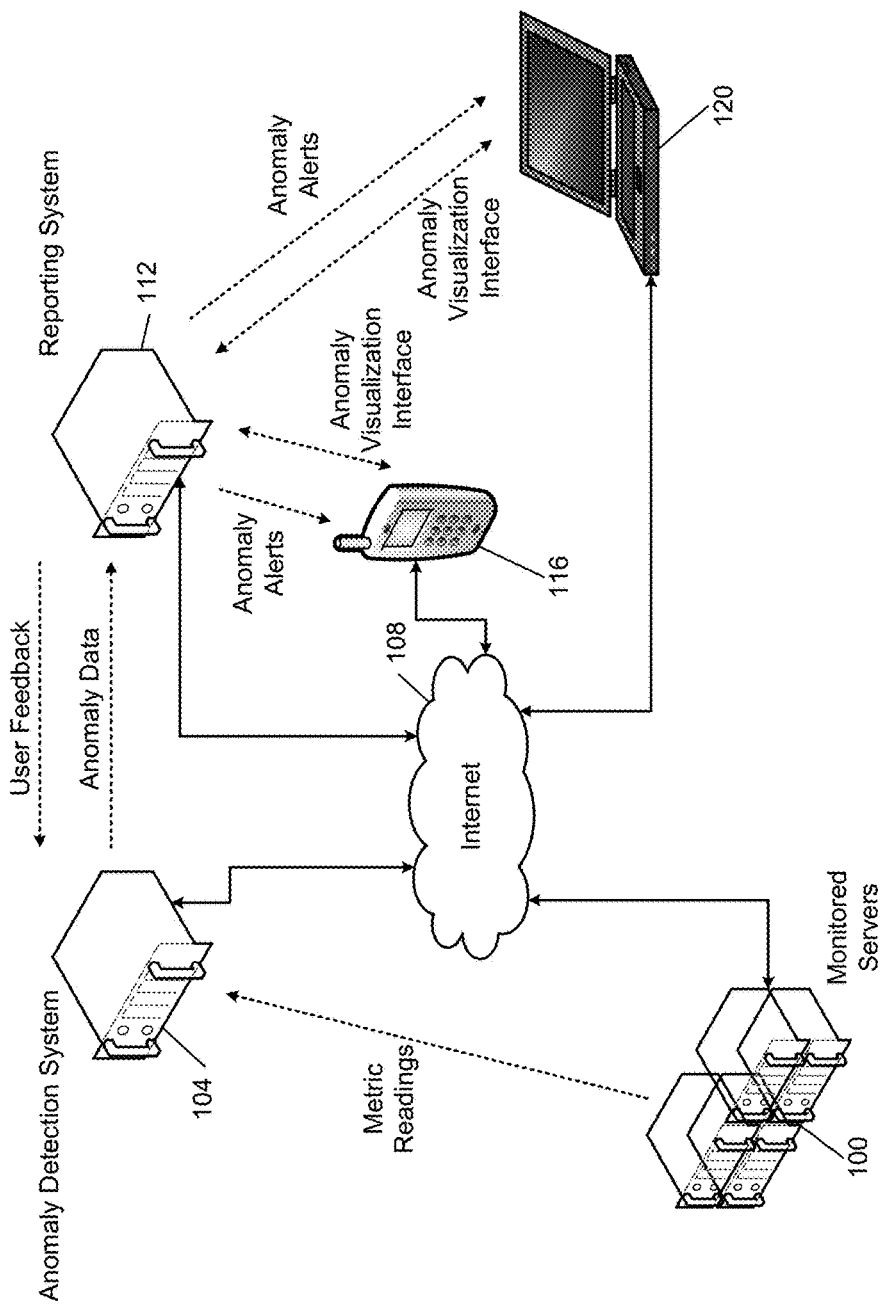
FIG. 4 is a graphical depiction of an autocorrelation function (ACF).

In FIG. 4, a set of monitored servers 100 is shown as an example of infrastructure to be monitored. The monitored servers 100 may include production servers as well as monitoring servers that measure metrics of the production servers. Some metrics may be generated and reported automatically while others are measured externally.

Although depicted as computing servers, monitored hardware can include not just computers but other hardware and software capable of instrumentation. For example, industrial control systems, factory automation, etc., may all generate and/or be observed to generate a number of metrics that can be evaluated by an anomaly detection system 104. Further, even within computing hardware, the monitored servers 100 could alternatively or additionally include desktop computers, smartphones, tablets, dedicated hardware (storage area networks, voice-over IP systems), etc.

The monitored servers 100 may be physical servers, virtual servers, hosted servers, etc. In one example, the monitored servers 100 may be instances in an Amazon Web Services (AWS), and Elastic Cloud Compute (EC2). As shown in FIG. 4 with a dashed line, metric readings are transmitted from the monitored servers 100 to the anomaly detection system 104.

Physically, the metric readings may be transported over the internet represented at 108 or over any other communication system. The metric readings will generally be encrypted when sent over the internet 108, such as by using a Virtual Private Network (VPN) or some other secure transport facility such as Secure File Transfer Protocol (SFTP) or Hypertext Transfer Protocol Secure (HTTPS).

The anomaly detection system 104 analyzes the metric readings and, as described in more detail below, characterizes normal and abnormal behavior and determines the significance of detected anomalies. This anomaly data is transmitted to a reporting system 112, which can generate anomaly alerts to system administrators. For example, these anomaly alerts may be sent via text message to a mobile phone 116 or by email or through a monitoring dashboard interface to a laptop 120.

The anomaly detection system 104 and the reporting system 112 may be integrated together and simply referred to as the anomaly detection system 104. They are shown separately in FIG. 4 simply for ease of illustrating their respective functionality. The anomaly detection system 104 and the reporting system 112 may be hosted on dedicated hardware or in cloud computing instances. The data they store may also be stored in dedicated hardware or in cloud storage, such as AWS Simple Storage Service (S3) and/or AWS Elastic Block Store (EBS).

The anomaly detection system 104 and the reporting system 112 may be owned and operated by the provider of the anomaly detection system 104 through a service agreement. Alternatively, the anomaly detection system 104 and the reporting system 112 may be purchased as hardware or as virtual machines and then operated by the owner of the monitored servers 100.

The mobile phone 116 interacts with an anomaly visualization interface presented by the reporting system 112. This interface may allow active anomalies to be seen in real time and may allow prior anomalies to be evaluated.

A user of the mobile phone 116 may provide feedback on various reported anomalies to the reporting system 112. For example, this feedback may identify an anomaly as representing a false positive or a true positive. A false positive means that the anomaly does not actually represent anomalous behavior or at least does not indicate an actual or impending issue. Meanwhile, a true positive would mean that the detected anomaly corresponded with some issue with the monitored servers 100.

The laptop 120 may also access the anomaly visualization interface. The interface may be tailored to different screen sizes such as by limiting the information provided to the mobile phone 116 to more significant information than might be shown to the laptop 120. The mobile phone 116 and the laptop 120 may be owned by system administrators employed by the owner of the monitored servers 100 or may be owned by the provider of the anomaly detection system 104 or a third party. Such a third party could monitor for anomalies and report to the owner of the monitored servers 100 when a problem appears to be occurring or expected.

The detected anomalies may signify, and be used to examine, a wide variety of issues. These issues include uptime and reliability, security, responsiveness to users, efficient resource usage, business trends, etc.

Anomaly Detection System

Figure 5:
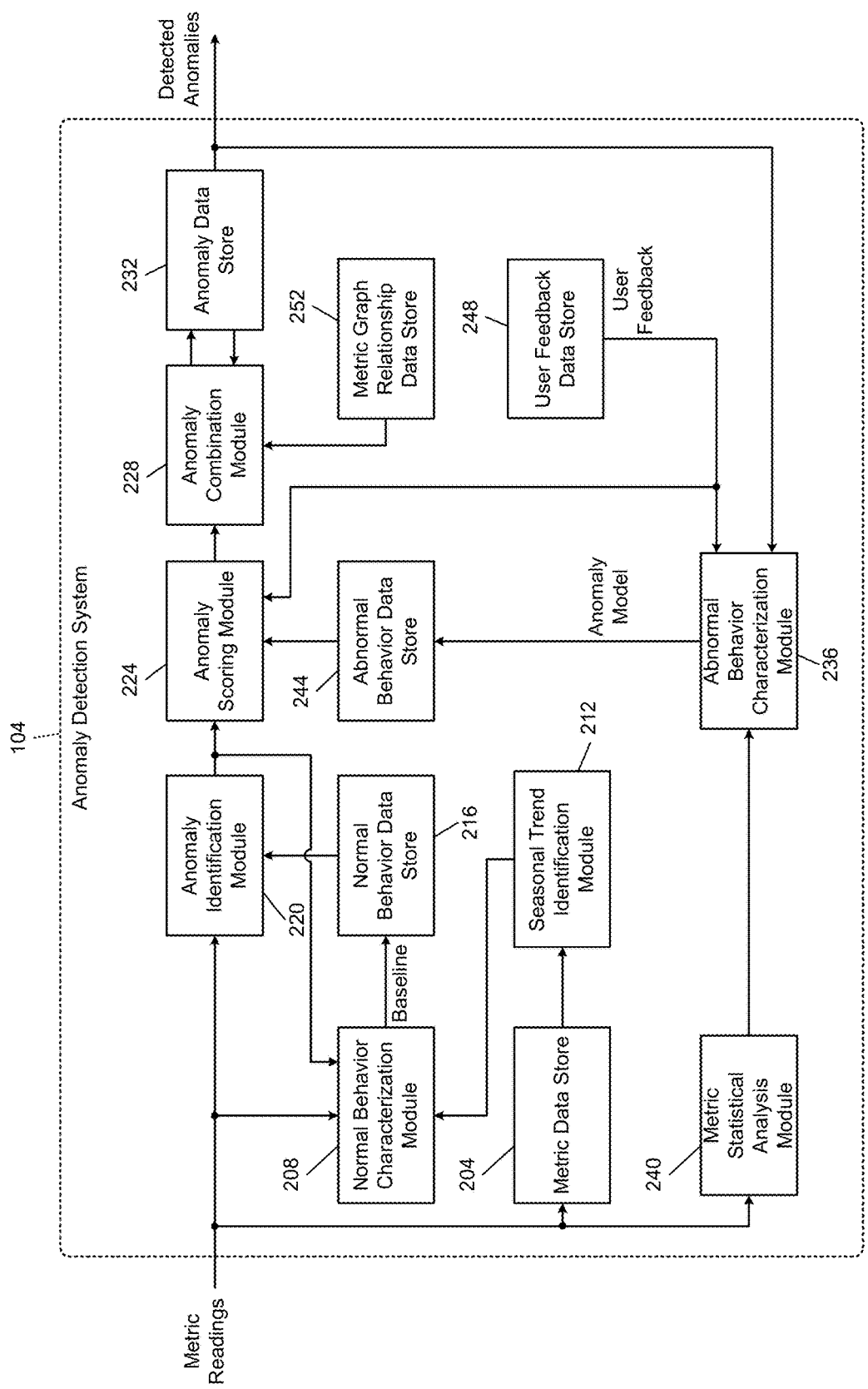
FIG. 5 is a functional block diagram of an example implementation of an anomaly detection system.

In FIG. 5, an example implementation of the anomaly detection system 104 is shown. Metric readings are received by the anomaly detection system 104 and stored in a metric data store 204. The metric readings are also processed by a normal behavior characterization module 208.

A seasonal trend identification module 212 may analyze readings of a metric over a period of time such as days, weeks, or months, and identifies whether there are seasonal trends in the metric. Seasonal trends may, for example, identify that each seven day period contains five consecutive days where activity for the metric is higher than the remaining two days. Of course, this likely corresponds to the standard five-day work week.

The seasonal trend identification module 212 may also determine that twenty-four-hour cycles are present where the expected value of the metric may differ depending on the time of day. In various implementations, these seasonal trends may be completely algorithmic, with no preset information provided to the seasonal trend identification module 212 about the existence of seven-day weeks, twenty-four-hour days, etc. In other implementations, some knowledge may be designed in, such as ranges corresponding to modern schedules, such as the 24-hour day, the 7-day week, and the 365.25-day year.

Based on seasonal trends and the observed metric readings, the normal behavior characterization module 208 determines a baseline for the metric. This baseline is stored in a normal behavior data store 216. The normal behavior data store 216 may store a model of the baseline along with whatever seasonal adjustments to the baseline that may be necessary. The baseline may be a function of time, and may define a range of expected values for each point in time.

An anomaly identification module 220 can then use the model from the normal behavior data store 216 to determine what the readings of a metric should be and identify deviations from that expected baseline. When an anomaly in a metric is identified, this detection is provided to an anomaly scoring module 224.

The anomaly scoring module 224 determines a score for the detected anomaly based on how significant the anomaly appears. As the intensity of the anomaly increases (that is, the amount of deviation of the metric away from the baseline), and as the duration of the anomaly increases, the score correspondingly increases. An anomaly combination module 228 combines the score for the single metric calculated by the anomaly scoring module 224 along with the scores of other detected anomalies. These scores and other characteristics of other anomalies are stored in an anomaly data store 232.

The anomaly data store 232 provides details of anomalies for other metrics to the anomaly combination module 228 and also stores scores and data related to combined anomalies as determined by the anomaly combination module 228. The anomaly data store 232 also provides information about the detected anomalies to, for example, the reporting system 112 of FIG. 4.

The detected anomalies are analyzed by an abnormal behavior characterization module 236 to determine a model of anomalies experienced by each metric. A metric statistical analysis module 240 may determine statistics for each metric, such as absolute minimum value, absolute maximum value, mean, median, standard deviation, etc. The absolute minimum and maximum values determine a range within which the metric operates. For example, the values of a CPU utilization metric will generally range between 0% and 100%.

The metric statistical analysis module 240 allows the anomaly detection system 104 to determine these ranges without explicit input from operators of the monitored servers 100. Using statistical analysis, the metric statistical analysis module 240 can determine that, for example, a metric of CPU utilization varies between 0 and a number close to 100 while a query response time varies between 40 and 3000 (which may represent time in milliseconds).

The abnormal behavior characterization module 236 analyzes anomalies for a metric from the anomaly data store 232 and statistical values for the metric from the metric statistical analysis module 240 and generates an anomaly model for storage in an abnormal behavior data store 244.

The anomaly model may also be based on user feedback from a user feedback data store. For example, anomalies identified by the user as being less significant or not representative of actual problems may be weighted more heavily in determining the anomaly model. The anomaly scoring module 224 uses the anomaly model for the metric for the abnormal behavior data store 244 to determine how significant a given anomaly is. For example, if the intensity of the detected anomaly is greater than the typical anomaly for the metric, this is an indication of greater significance. Further, if the duration of the anomaly has already exceeded an expected value of anomaly duration, this is yet another indication of significance of the anomaly.

When combining multiple anomalies into a single combined anomaly, relationships between the metrics are specified by a metric graph relationship data store 252. When multiple anomalies are present across related metrics, this may be an indication of greater significance of the combined anomaly.

Seasonal Trend Identification Module

Figure 6:
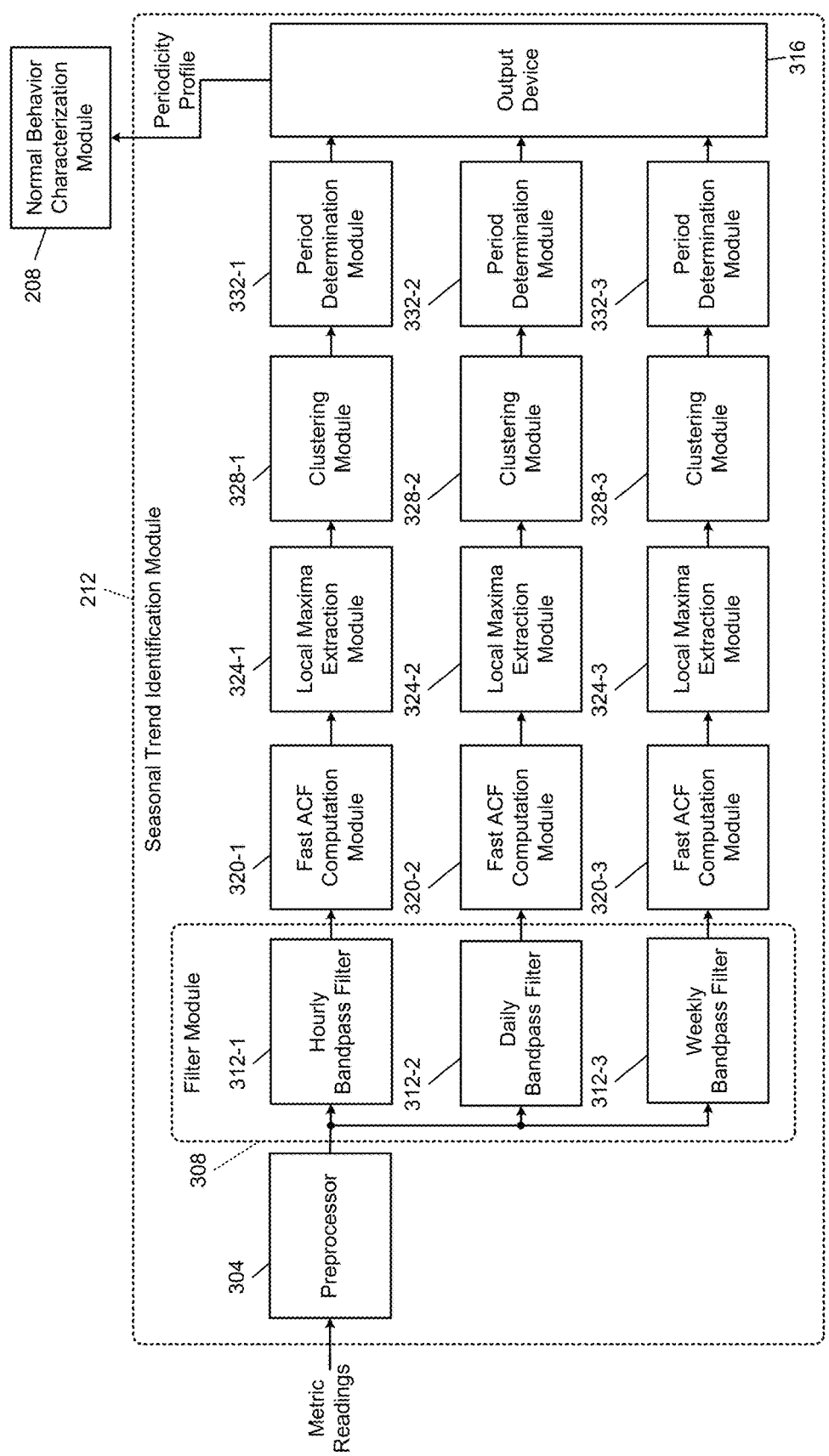
FIG. 6 is a functional block diagram of an example implementation of the seasonal trend identification module of FIG. 5.

In FIG. 6, an example implementation of the seasonal trend identification module 212 includes a preprocessor 304 that receives time series data of a metric for evaluation. The preprocessor 304 identifies contiguous sections of the time series data that are not missing large gaps of metric readings. Each of these sets of contiguous data may be evaluated separately. The preprocessor 304 may supply missing data points for small gaps in the data, such as by interpolating. Interpolation may be linear or may use higher-order polynomial interpolation. The preprocessor 304 may also de-trend the data.

A filter module 308 filters the processed metric data. For example, the filter module 308 may apply one or more bandpass filters targeted at different ranges of periodicity. For example, when evaluating metrics tied to real-world workloads that may vary on a daily, hourly, or weekly basis, the following filters may each be applied to the processed data: an hourly bandpass filter 312-1 with a pass-band centered about a period of approximately one hour, a daily bandpass filter 312-2 with a pass-band centered about a period of approximately one day, and a weekly bandpass filter 312-3 with a pass-band centered about a period of approximately one week (collectively, "filters 312").

Figure 7:
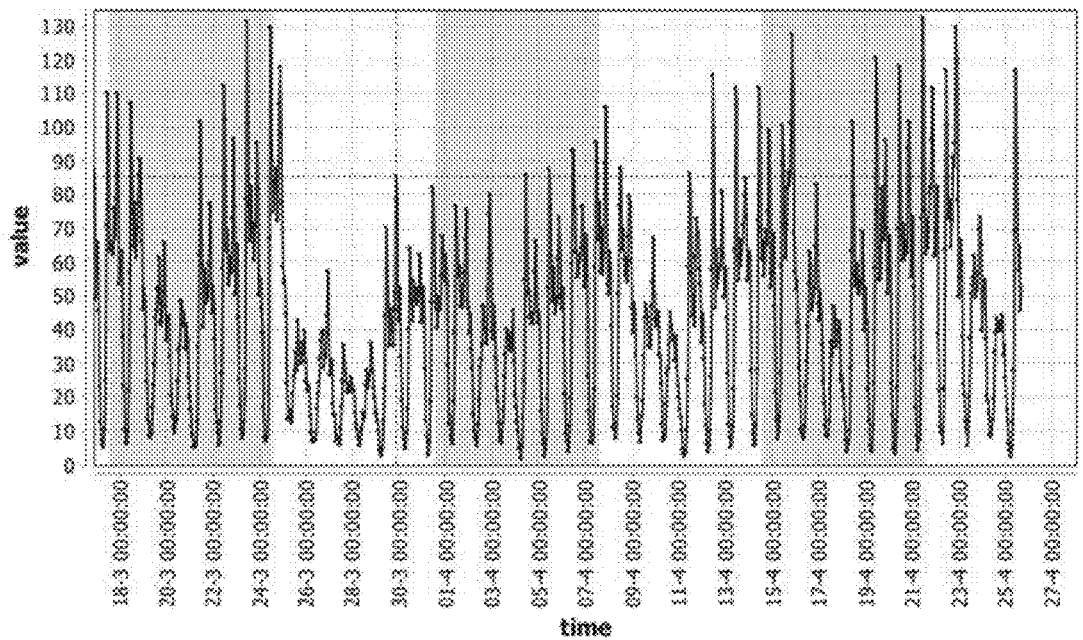
FIG. 7 is a plot of example time domain data for a chosen metric.
Figure 8:
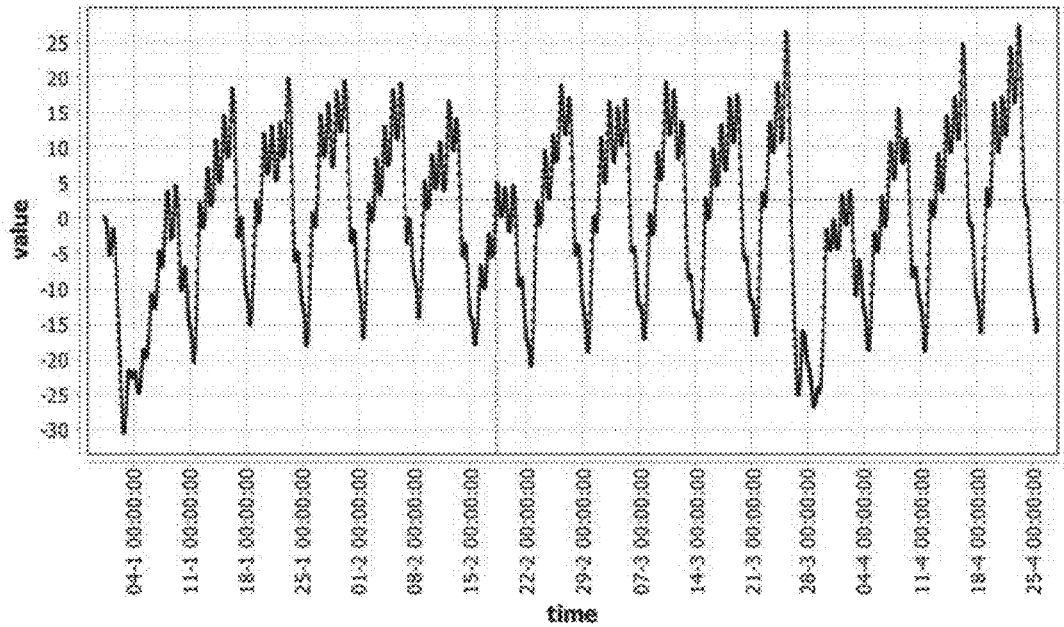
FIG. 8 is a plot of the time domain data of FIG. 7 after bandpass filtering.

The filters implemented by the filter module 308 may be specified during configuration of the seasonal trend identification module 212 for certain metrics. The filters implemented by the filter module 308 may be configured differently and there may be more or fewer filters for different metrics. The filters 312 may be implemented digitally as third-order Butterworth filters, as described in more detail below. For example only, see FIG. 7 for time series data of a metric and FIG. 8 for bandpass filtered data of the metric of FIG. 7.

Each filtered output from the filter module 308 is processed separately until an output device 316 provides a period profile to the normal behavior characterization module 208. In some implementations, the period profile is simply a single selected period from across the filtered sets of data. In other examples, the period profile may be based on more than one of the determined periods.

Although FIG. 6 depicts a set of processing modules corresponding to each filtered data set, some or all of the modules may take turns processing different filtered data. Each set of filtered data may be processed in parallel or the sets of filtered data may be processed one after another in series. In some implementations, there may be three sets of hardware and/or software for processing filtered data that share responsibility for the sets of filtered data. For example, if only two sets of filtered data are produced by the filter module 308, the three sets of processing hardware may share the processing task of the two sets of filtered data. For example, two sets of processing hardware may cooperate together to process one set of filtered data.

Fast ACF computation modules 320-1, 320-2, and 320-3 calculate the ACF for the sets of filtered data, respectively, from the filter module 308. Local maxima extraction modules 324-1, 324-2, and 324-3 identify local maxima of the ACF data. Clustering modules 328-1, 328-2, and 328-3 perform a clustering analysis on the local maxima. Period determination modules 332-1, 332-2 and 332-3 identify significant periods from the clustering analysis and each output a significant period value to the output device 316. In some implementations, the period determination modules 332 will output an indication that no period is identified if no period from the clustering analysis appears to be significant.

The processing hardware corresponding to the hourly bandpass filter 312-1 will be described, and the processing hardware corresponding to the daily bandpass filter 312-2 and the weekly bandpass filter 312-3 may be implemented similarly. In fact, when processing hardware is implemented as computer-executable instructions executing on a processing system, the same code may simply be called with respect to each of the outputs of the hourly bandpass filter 312-1, the daily bandpass filter 312-2, and the weekly bandpass filter 312-3.

The fast ACF computation module 320-1 computes the ACF, which may be defined as follows:

$$\rho(\tau) = \mathbb{C}or(X_t, X_{t+\tau}) \quad (1)$$
$$= \frac{\mathbb{E}[(X_t - \mathbb{E}[X_t])(X_{t+\tau} - \mathbb{E}[X_{t+\tau}])]}{\sqrt{\mathbb{V}ar[X_t]\mathbb{V}ar[X_{t+\tau}]}}$$
$$= \frac{\mathbb{E}[X_t \cdot X_{t+\tau}] - \mathbb{E}[X_t]\mathbb{E}[X_{t+\tau}]}{\sqrt{\mathbb{V}ar[X_t]\mathbb{V}ar[X_{t+\tau}]}}$$
$$= \frac{\mathbb{E}[X_t \cdot X_{t+\tau}] - \mathbb{E}[X_t]\mathbb{E}[X_{t+\tau}]}{\sqrt{(\mathbb{E}[X_t^2] - \mathbb{E}[X_t]^2)(\mathbb{E}[X_{t+\tau}^2] - \mathbb{E}[X_{t+\tau}]^2)}}$$

For each value of t, the ACF computation requires O(N) operations, where N is the length of the series. So the computation of the ACF for all N values of t is an $O(N^2)$ algorithm. However, as mentioned above, sampling the ACF for every possible value of t may provide unnecessarily high precision at high values of t. For example, consider a series sampled every 300 seconds (five minutes) during a month. The precision Dt of the ACF when t is equal to two weeks is:

$$\frac{\Delta \tau}{\tau} = \frac{300}{2*7*24*3600} \approx 2.4 \cdot 10^{-4} \quad (2)$$

This precision is higher than necessary and very costly in terms of memory footprint and processing time. The present disclosure therefore samples t at greater intervals as t increases. In other words, the present disclosure reduces the range of $$\frac{\Delta \tau}{\tau}.$$

For example, the precision $$\frac{\Delta \tau}{\tau}$$

may be held approximately equal. To keep the precision $$\frac{\Delta \tau}{\tau}$$

at a constant value of c (such as 0.005), t will be sampled geometrically:

$$\tau_n = \tau_0 c^n \quad (3)$$

This in contrast to the linear sampling of the traditional ACF:

$$\tau_n = \tau_0 n \quad (4)$$

The number of data points of the ACF is then only log(N), making the complexity of the algorithm O(N·log(N)). As an example of the ACF, see FIG. 9, where the ACF was calculated from the filtered data of FIG. 8.

In some implementations, the fast ACF computation module 320-1 may constrain the value of t according to the expected periodicity for the filtered data. As an example, since the filtered data received by the fast ACF computation module 320-1 has been bandpass filtered about one hour, periodicity below some threshold (such as half of the middle period of the passband, or 30 minutes in this example) would not be expected. As a result, the fast ACF computation module 320-1 may begin evaluating the ACF at that threshold value of t (30 minutes in this example).

The local maxima extraction module 324-1 identifies the local maxima of the computed ACF. This is because time series data having a period T will result in an ACF that has a local maximum at each multiple of T. An ACF calculated from real-world data may have a large number of local maxima. As a result, the present disclosure focuses on maxima above a certain threshold. This threshold may be constant or may vary with t. In order to determine whether a correlation coefficient at t is statistically relevant, Fisher's method indicates that R(t) transformed by S will follow a Gaussian law, which depends on number of points used to build the correlation coefficient. See Equation 5:

$$S(\rho(\tau)) = \frac{1}{2}\ln\left(\frac{1+\rho(\tau)}{1-\rho(\tau)}\right) \mapsto N\left(0, \frac{1}{\sqrt{N-\tau-3}}\right) \quad (5)$$

A P value may be chosen based on a desired probability of mistakes. For example, the P value may be set to 1E-4. The threshold may then be calculated as a function of t by solving Equation 6 for t:

$$S(\rho(\tau))\sqrt{N-\tau-3} < P_{value} \quad (6)$$

Figure 9:
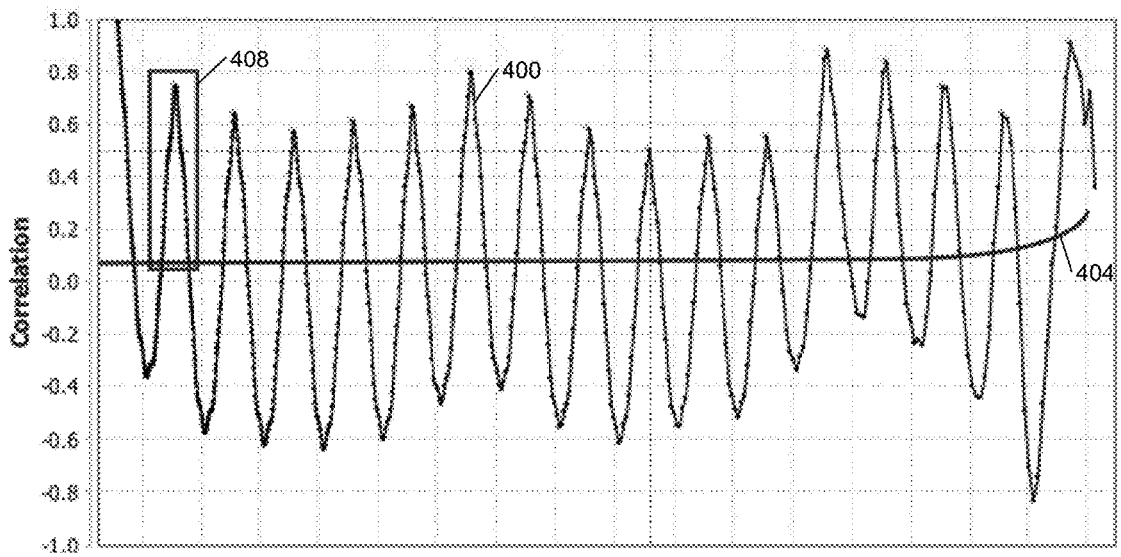
FIG. 9 is a plot of the ACF for the filtered data of FIG. 8.

The threshold divides the ACF into a set of segments. For example, see FIG. 9, in which an example trace 400 of an ACF and a threshold curve 404 are shown. Each segment of the ACF begins when the ACF crosses the threshold 404 in a positive direction and ends when the ACF crosses the threshold 404 in a negative direction. In FIG. 9, a first segment 408 of the ACF 400 is shown with a rectangle. The global maximum of each segment is a local maximum of the ACF 400. By splitting the ACF 400 into segments above the threshold 404, each global maximum of the segment is a statistically significant ACF value.

The clustering module 328-1 clusters the local maxima determined from the ACF. First, the difference in t between each pair of consecutive local maxima is determined. These differences, indicating the spacing of the local maxima, are then clustered. The cluster having the greatest count of inter-maximum differences indicates the periodicity of the ACF.

The period determination module 332-1 determines whether the occurrence count of any cluster is above a threshold. A number of occurrences below the threshold may indicate that the detected cluster is not statistically significant. With perfectly periodic input data, a series of duration D and period T will have exactly $$\frac{D}{T}$$

local maxima. However, with real-world data, the threshold will have to be set lower than this theoretical peak. In one example, the threshold is set to be half the theoretical peak—that is, $$\frac{1}{2}\frac{D}{T}.$$

Figure 10:
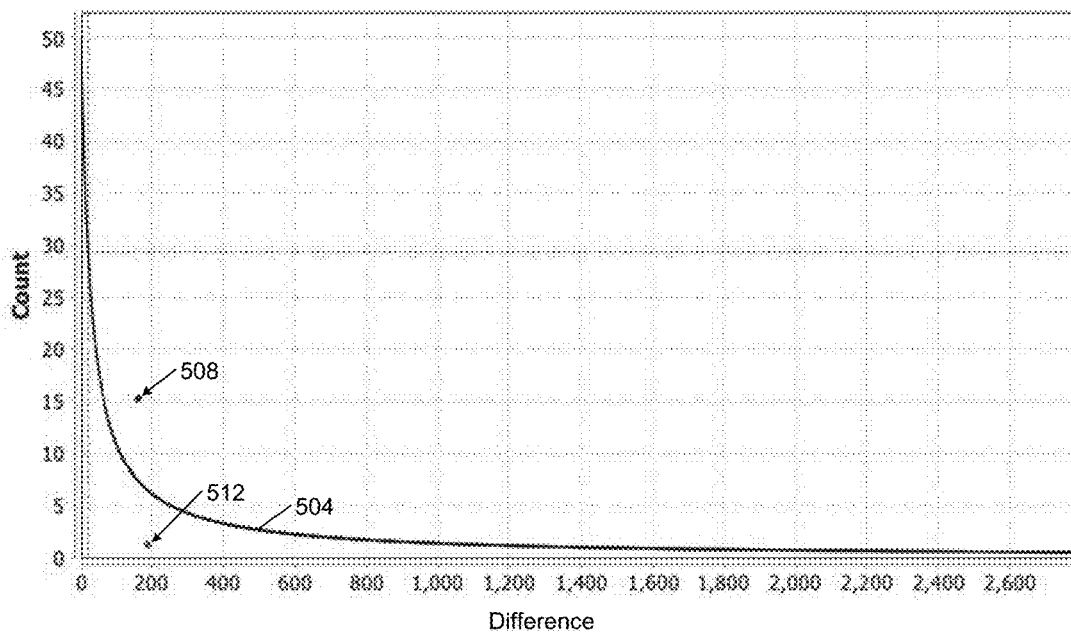
FIG. 10 is a scatter plot of the occurrence count for clusters of maximum-to-maximum differences from the ACF of FIG. 9 and includes a graphical trace of a threshold inequality.

In FIG. 10, a threshold 504 is graphically plotted based on the function $$\frac{1}{2}\frac{D}{T}.$$

A cluster 508 has a number of occurrences indicated by the clustering module 328-1 and a cluster 512 has a lower number of occurrences. The cluster 512 lies below the threshold 504 and is therefore determined not to be statistically significant. The cluster 508 lies above the threshold 504 and therefore indicates periodicity of the ACF.

The period determination module 332-1 outputs the highest occurrence inter-maximum difference as the significant period for the present filtered data. If no clusters have an occurrence count above the threshold 504, the period determination module 332-1 may indicate that no significant period was found.

The output device 316 may select the lowest-frequency period for output to the normal behavior characterization module 208. In other implementations, the output device 316 may output all identified significant periods, meaning that the period profile may have as many indicated periods as there are filter bands. The output device 316 may perform a sanity check on any identified significant period by comparing that period to the passband of the filter corresponding to the identified significant period. If an identified significant period is outside of the corresponding passband, then the output device 316 may discard the identified significant period.

Flowcharts

Figure 11:
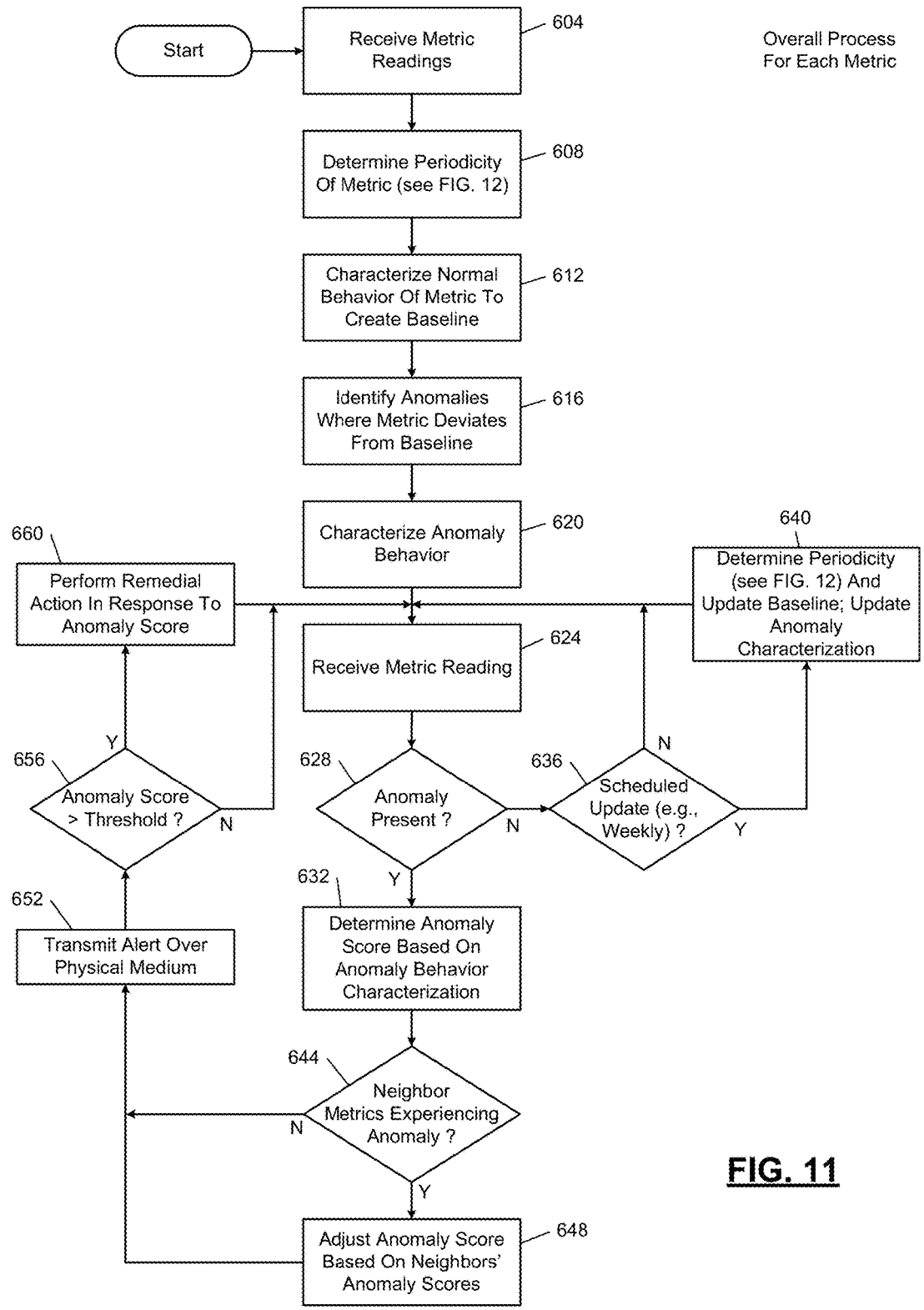
FIG. 11 is a flowchart of an overall process performed for each metric.

In FIG. 11, overall control for a single metric is shown. The process may be performed on each metric of interest to the system in parallel. In some implementations, the process may detect anomalies partially based on values from other metrics. While the process for each metric may effectively run in parallel, with a limited number of processor threads and/or memory space, not all metrics will be processed simultaneously.

At 604, control receives readings for the metric. The initial set of metric readings may represent historical data that can be used for establishing a normal baseline. In addition, characteristics of anomalies may also be determined from the historical data. In 608, control determines periodicity of the metric according to the present disclosure, as described in more detail in FIG. 12. At 612, control uses the periodicity profile to characterize normal behavior of the metric and create a baseline.

At 616, control identifies anomalies in which the metric deviates from the baseline. At 620, control characterizes anomaly behavior. At 624, control begins receiving new metric readings. At 628, control determines whether an anomaly is present. For example, control may determine if an anomaly is present if the new metric readings fit the profile of anomalous behavior and deviate from the baseline. If an anomaly is present, control transfers to 632; otherwise, control transfers to 636.

At 636, if the amount of time since metric readings were last characterized has exceeded a certain threshold, such as a week, control transfers to 640; otherwise, control returns to 624. At 640, control determines periodicity according to FIG. 12 and updates the baseline. Control may also update the anomaly characterization. Control then returns to 624. At 632, control determines an anomaly score of the detected anomaly based on the anomaly behavior characterization. At 644, control determines whether neighboring metrics are also experiencing an anomaly. If so, control transfers to 648; otherwise, control transfers to 652.

At 648, control adjusts the anomaly score based on the anomaly scores of the neighbor metrics. For further discussion of neighboring metrics and how scores of neighboring metrics can be used, see U.S. patent application Ser. No. 14/950,357, filed Nov. 24, 2015, titled "System and Method for Transforming Observed Metrics into Detected and Scored Anomalies," with first-named inventor Yoni Yom Tov Ben Simhon. The entire disclosure of this application is incorporated by reference.

At 652, control transmits an alert based on the anomaly over a physical medium. For example, the alert may be sent by wired or wireless networking protocols to an operator of the equipment where the anomaly was observed or to a monitoring service responsible for monitoring the system where metrics are gathered. The alert may be entered into a log file stored in a computer readable medium, which may be written to long term storage on a periodic basis. The alert may also result in visual inspection by an administrator.

At 656, if the anomaly score is greater than the threshold, control transfers to 660. Otherwise, control returns to 624. At 660, control performs automated remedial action in response to the anomaly score. For example, some metrics may indicate that a server is being overloaded. The automated remedial action may be to invoke additional virtual server instances to allow for load sharing. Another remedial action may reduce the priority of or pause administrative tasks, such as system updates or storage rebalancing. In other words, if a server or router is being overly taxed by background processes that attempt to balance data storage across various servers or various locations, those background tasks may be paused to avoid hampering foreground tasks such as user access. Control then returns to 624.

Figure 12:
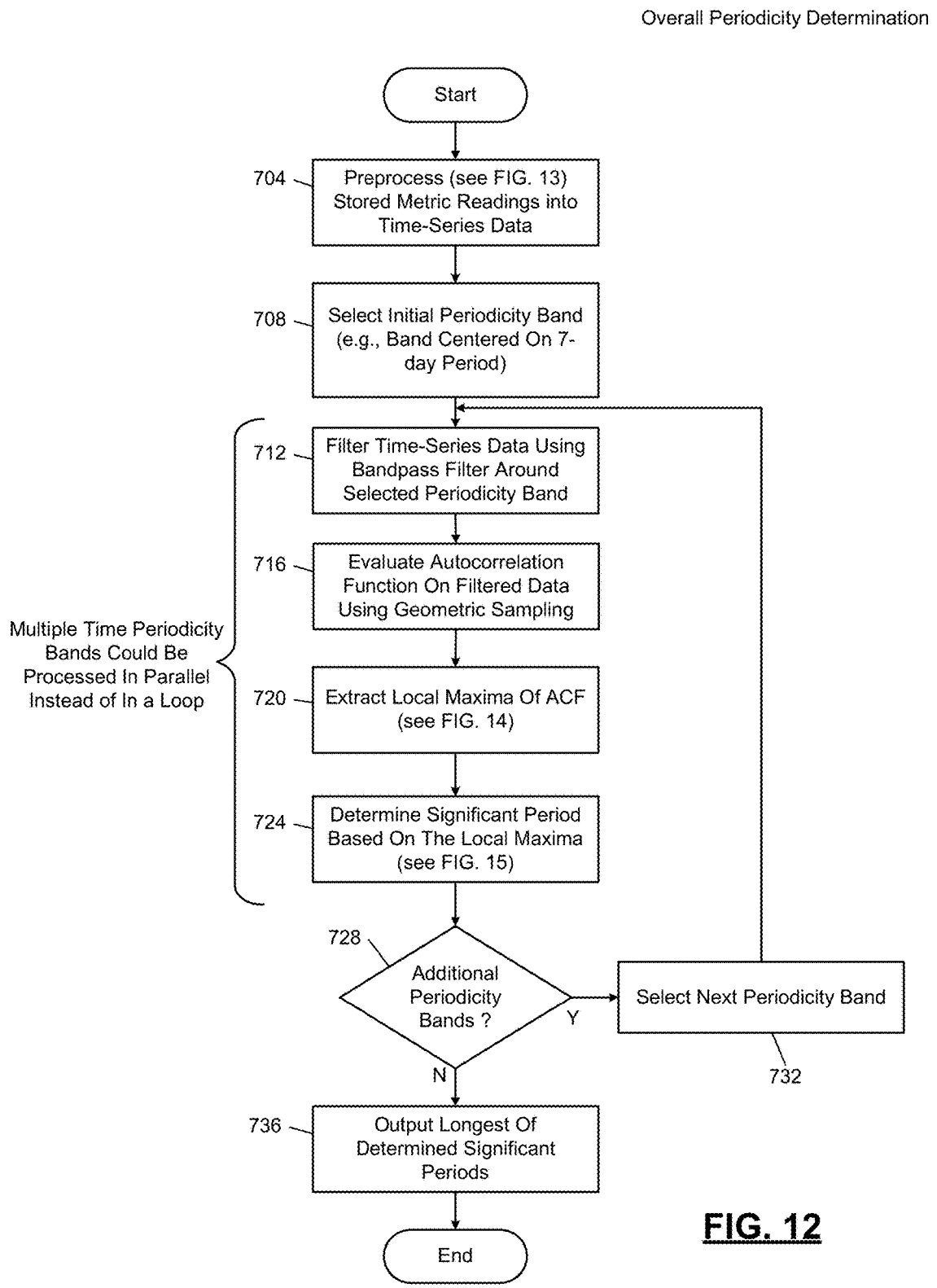
FIG. 12 is a flowchart of example periodicity characterization for a metric.

In FIG. 12, overall periodicity determination for a metric in one example begins at 704. Control preprocesses stored metric readings into time-series data, such as described in more detail in FIG. 13. At 708, control selects an initial periodicity band. Each band is centered on a potential periodicity of the data. For example, a band centered on a seven-day period may encompass approximately four days to approximately ten days.

At 712, the time series data is filtered by a bandpass filter designed around the selected periodicity band. For example, the bandpass filter may substantially reduce frequencies greater than once every four days or lower than once every ten days.

At 716, control evaluates the autocorrelation function (ACF) on the filtered data using geometric sampling of t. At 720, control extracts local maxima of the ACF, such as is described in FIG. 14. At 724, control determines the presence of a significant period based on the local maxima, as described in more detail in FIG. 15. At 728, control transfers to 732 if there are additional periodicity bands to evaluate for the time series. Otherwise, if all the periodicity bands have been evaluated, control transfers to 736. At 732, control selects the next periodicity band and returns to 712.

The processing in 712, 716, 720, and 724 is shown being performed in series for each band but could be performed in parallel. At 736, control outputs the longest of the determined significant periods as the periodicity of the metric. Control then ends.

Figure 13:
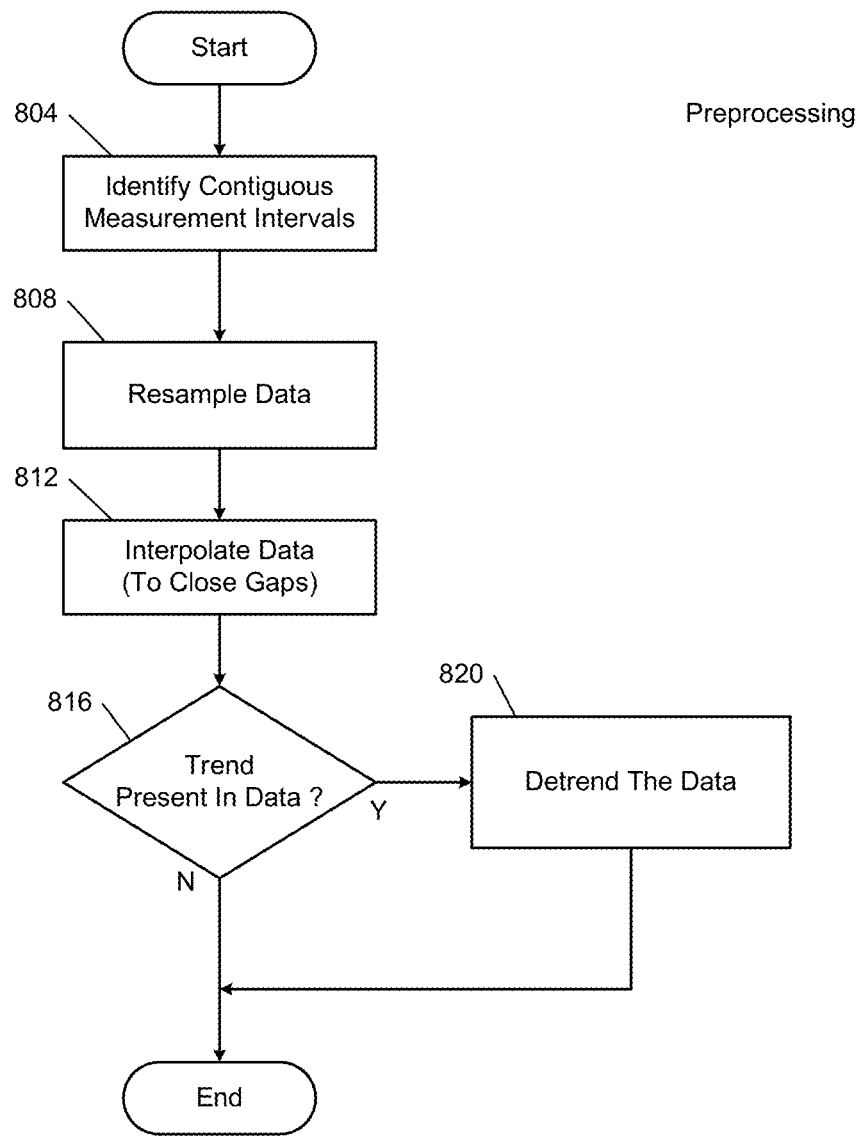
FIG. 13 is a flowchart of example preprocessing for periodicity determination.

In FIG. 13, example preprocessing of stored metric readings begins at 804 where control identifies contiguous measurements. Sets of data for one metric separated by a large gap of time may be processed as separate metrics. Their periodicities may then be compared and the periodicity of the more recent set of data may control.

At 808, data is resampled. Resampling data may include determining values for the metric at equally spaced increments of time. Extrapolation and interpolation may be used on data sampled at irregular intervals to estimate the metric values that would have been obtained using a constant sampling interval. At 812, control interpolates missing data points to create a set of uniform-sampled data points.

At 816, control determines whether a trend is present in the data, such as by performing a linear regression and determining whether the slope of the resulting line is non-zero. If a trend is present, control transfers to 820; otherwise, control ends. At 820, control de-trends the data by subtracting the trend line from the data. Control then ends. In various implementations, de-trending may be replaced by a high-pass filter.

Figure 14:
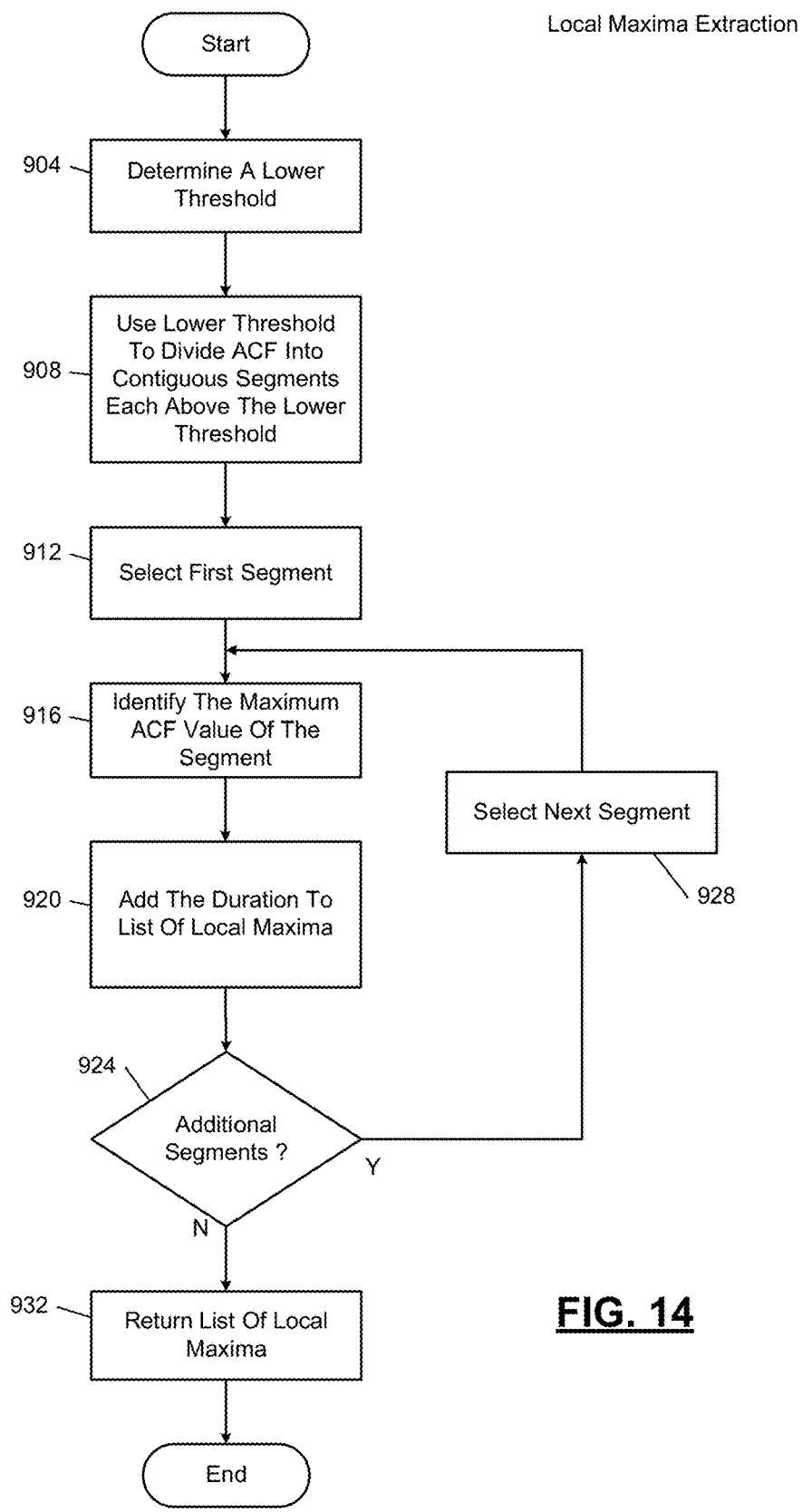
FIG. 14 is a flowchart of example local maxima extraction from an ACF.

In FIG. 14, local maxima extraction begins at 904, where a lower threshold of a correlation value is determined. At 908, the lower threshold is used to divide the ACF into contiguous segments that are each continuously above the lower threshold. In 912, control selects the first segment.

At 916, control identifies the maximum ACF value of the segment. At 920, control adds the duration corresponding to the maximum ACF value to a list of local maxima. At 924, control determines whether there are additional segments. If so, control transfers to 928; otherwise, control transfers to 932. At 928, control selects the next segment and returns to 916. At 932, control returns the list of local maxima and then ends.

Figure 15:
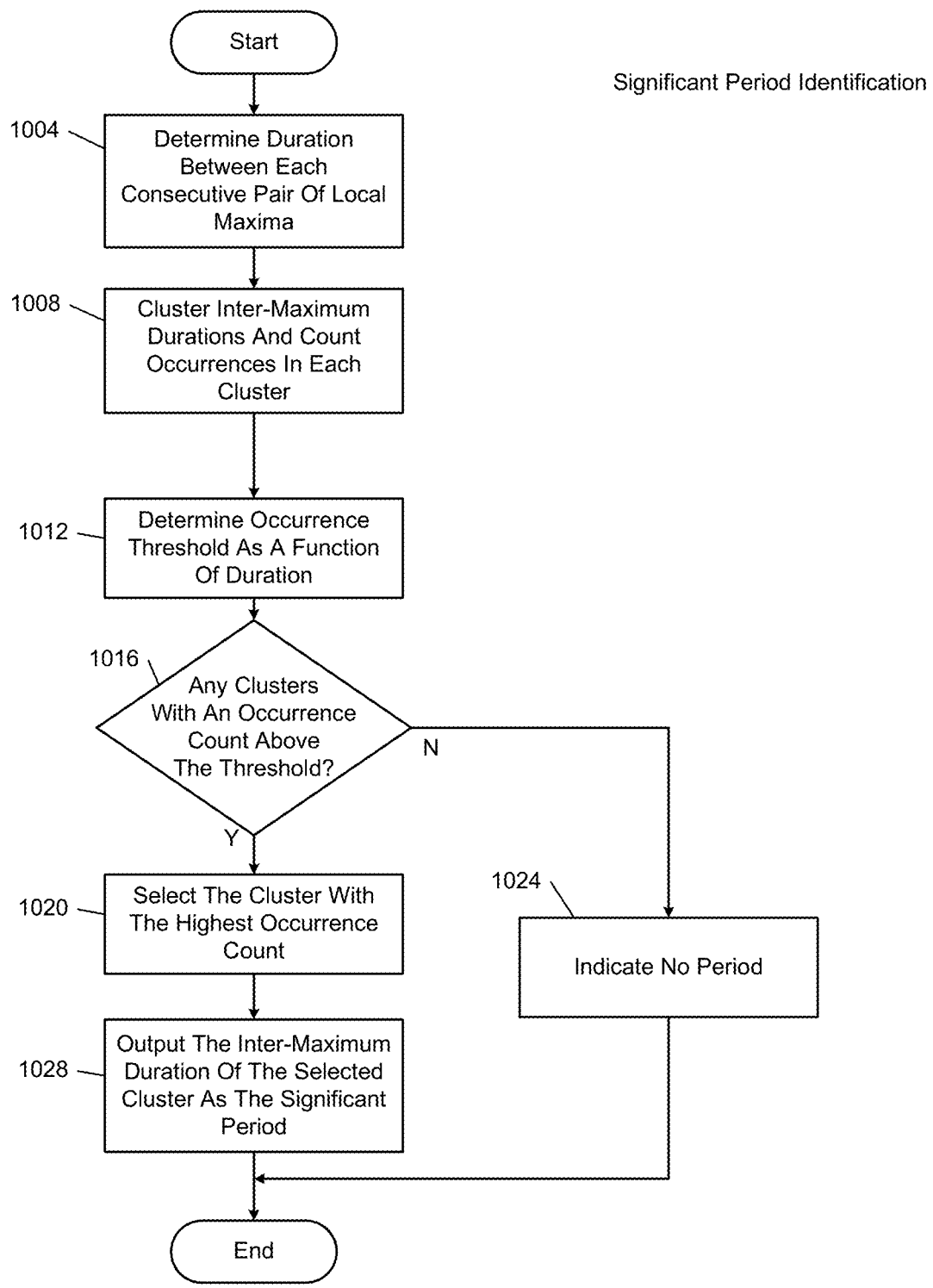
FIG. 15 is a flowchart of example period identification as part of periodicity determination.

In FIG. 15, identification of the significant period begins at 1004, where the duration between each consecutive pair of local maxima is calculated. At 1008, control clusters these inter-maximum durations and counts the number of occurrences in each cluster. At 1012, determines an occurrence threshold, which may be a function of the duration.

At 1016, if there are any clusters with an occurrence count above the threshold, control transfers to 1020; otherwise, control transfers to 1024. At 1024, there were no statistically significant clusters and therefore control indicates that there is no period associated with this periodicity band. Control then ends. At 1020, control selects the cluster with the highest occurrence count. At 1028, control outputs the inter-maximum duration of the selected cluster as the significant period and control ends.

Filters

Analog filter technology is designed to work with continuous time. By contrast, digital filters are designed for a discrete time so are generally more suitable for a computer-based implementation. Since the theory of analog filters is more developed, a standard method is to first design an analog filter and then transform the designed analog filter to a digital filter. The bandpass filters referenced above may be designed using this process.

The standard Butterworth low-pass analog filter is defined by this transfer function:

$$H(s) = \frac{G_0}{B_n\left(\frac{\omega}{\omega_c}\right)}$$

where $B_n$ is:

$$B_n(s) = \prod_{k=1}^{\frac{n}{2}} \left[s^2 - 2s\cos\left(\frac{2k+n-1}{2n}\pi\right) + 1\right] \quad n = \text{even}$$

$$B_n(s) = (s+1)\prod_{k=1}^{\frac{n-1}{2}} \left[s^2 - 2s\cos\left(\frac{2k+n-1}{2n}\pi\right) + 1\right] \quad n = \text{odd}$$

The poles of the Butterworth filter are on the unit circle on the negative real half plane. An interesting property of the filter is that the gain is maximally flat in the passing band. Other filter designed may be used, such as Chebyshev and L-optimal.

To determine a standard low-pass filter $H_{std}(s)$ at a cut-off frequency $\omega_c$, the following transformation can be used:

$$s \mapsto \frac{s}{\omega_c}$$

and so:

$$H(s) = H_{std}\left(\frac{s}{\omega_c}\right)$$

Similarly, for a high-pass filter, the transformation is:

$$s \mapsto \frac{\omega_c}{s}$$

A band-pass filter for the two cut-off frequencies $\omega_{low}$ and $\omega_{high}$ begins with $\omega_m$ as the middle frequency:

$$\omega_m = \sqrt{\omega_{low}\omega_{high}}$$

and the dimensionless number measuring the size of the passing band is:

$$B = \frac{\omega_{high} - \omega_{low}}{\omega_m}$$

The following transformation is then used:

$$s \mapsto \frac{\left(\frac{s}{\omega_m} + \frac{\omega_m}{s}\right)}{B}$$

With the above notation, the transformation for the stop band is:

$$s \mapsto \frac{B}{\left(\frac{s}{\omega_m} + \frac{\omega_m}{s}\right)}$$

To convert an analog transfer function into a digital filter, the bi-linear transformation, an expression of the trapezoid integration method, can be used:

$$s \mapsto \frac{2}{T}\frac{z-1}{z+1} = \frac{2}{T}\frac{1-z^{-1}}{1+z^{-1}}$$

The analog frequencies are then mapped to the digital frequencies:

$$\omega_a = \frac{2}{T}\tan\left(\frac{\omega 2}{T}\right)$$

For a transfer function defined in Z-plane, a recursive algorithm can be derived for computing the filtered series. Assume the filter is defined by:

$$H(z) = \frac{Y(z)}{X(z)} = \frac{N(z^{-1})}{D(z^{-1})} = \frac{n_0 + n_1 z^{-1} + n_2 z^{-2} \ldots}{d_0 + d_1 z^{-1} + d_2 z^{-2} \ldots}$$

If $d_0 \neq 0$, the numerator and the denominator can both be divided by $d_0$. Assuming that $d_0 = 1$ leads to:

$$H(z) = \frac{Y(z)}{X(z)} = \frac{n_0 + n_1 z^{-1} + n_2 z^{-2} \ldots}{1 + d_1 z^{-1} + d_2 z^{-2} \ldots}$$

Solving for Y(z) results in:

$$Y(z) = X(z)[n_0 + n_1 z^{-1} + n_2 z^{-2} \ldots] - Y(z)[d_1 z^{-1} + d_2 z^{-2} \ldots]$$

Then applying the inverse Z-transform results in:

$$y[t] = n_0 x[t] + n_1 x[t-1] + n_2 x[t-2] + \ldots - d_1 y[t-1] - d_2 y[t-2] - \ldots$$

This equation allows the derivation of a simple algorithm for filtering the Fourier domain. First, the size of the buffer for the input can be equal to the degree of the numerator and the size of the buffer for the output of the filter can be the degree of the denominator. As an example, for a low-pass Butterworth filter of order 3, the last three values of the output need to be buffered and none of the previous values of the input need to be retained. In contrast to a finite impulse response filter, the size of this buffer is generally lower, and is not dependent on the cut-off frequencies. For the filters used in the anomaly detection system, each bank filter can be designed using a third-order Butterworth filter with specific cut-off frequencies related to the range of periodicity corresponding to the filter.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally)

between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:
1. A processing system comprising:
an input device configured to receive a time series of values of a first metric, wherein the first metric corresponds to a measurement of computing system performance;
a seasonal trend identification module configured to determine a periodicity profile for the first metric based on the time series of values, wherein the seasonal trend identification module includes:
a computation module configured to calculate an autocorrelation function (ACF) based on the time series of values across a set of values of tau, wherein the spacing between each consecutive pair of values in the set of values of tau increases as tau increases;
a local maxima extraction module configured to identify local maxima of the calculated ACF; and
a period determination module configured to determine a significant period based on spacing between the local maxima and selectively output the significant period as the periodicity profile;
a normal behavior characterization module configured to generate a baseline profile indicating normal behavior of the first metric based on the time series of values and the periodicity profile;
an anomaly identification module configured to selectively identify an anomaly in present values of the first metric in response to the present values deviating outside the baseline profile; and an alert module configured to generate an alert message in response to the identified anomaly and transmit the alert message to a designated user over a network interface, wherein the seasonal trend identification module includes a filter module configured to filter the time series of values prior to calculation of the ACF, wherein the filter module is configured to generate a plurality of filtered data sets, wherein each of the filtered data sets corresponds to a different bandpass filter, and wherein the seasonal trend identification module includes an output device configured to output the periodicity profile based on a lowest significant period across the plurality of filtered data sets.

2. The processing system of claim 1 further comprising:
an anomaly behavior characterization module configured to (i) analyze a plurality of prior anomalies present in the time series of values and (ii) develop an anomaly model of the first metric based on the analysis of the prior anomalies; and
an anomaly scoring module configured to determine a first score for the identified anomaly based on (i) characteristics of the identified anomaly and (ii) the anomaly model,
wherein the alert module is configured to generate the alert message only in response to the first score exceeding a threshold.

3. The processing system of claim 2, wherein the anomaly scoring module is configured to determine the first score further based on data of contemporary anomalies for metrics other than the first metric.

4. The processing system of claim 1, wherein the seasonal trend identification module includes a preprocessor configured to interpolate and detrend the time series of values prior to calculation of the ACF.

5. The processing system of claim 1, wherein the spacing between each consecutive pair of values of tau monotonically increases as tau increases.

6. The processing system of claim 5, wherein the spacing between each consecutive pair of values of tau increases geometrically as tau increases.

7. The processing system of claim 1, wherein the local maxima extraction module is configured to:
split the ACF into segments using a threshold function, wherein each segment of the segments (i) has endpoints at points where the ACF is equal to the threshold function and (ii) at all other points the ACF is greater than the threshold function; and
identify, for each segment of the segments, a global maximum of the segment as a local maximum of the ACF.

8. The processing system of claim 1, wherein the seasonal trend identification module includes a clustering module configured to:
calculate a difference in tau between each consecutive pair of local maxima;
identify clusters of the differences; and
count occurrences of the differences in each cluster,
wherein the period determination module is configured to selectively output the difference corresponding to the one of the clusters having the highest occurrence count.

9. The processing system of claim 8, wherein the period determination module is configured to:
compare the highest occurrence count to a threshold;
in response to the highest occurrence count exceeding the threshold, indicate that the difference corresponding to the highest occurrence count is the significant period; and
in response to the highest occurrence count failing to exceed the threshold, indicate that no significant period is present.

10. A processing system comprising:
an input device configured to receive a time series of values of a first metric, wherein the first metric corresponds to a measurement of computing system performance;
a seasonal trend identification module configured to determine a periodicity profile for the first metric based on the time series of values, wherein the seasonal trend identification module includes:
a preprocessor configured to interpolate and detrend the time series of values to create processed data;
a filter module configured to generate a plurality of filtered data sets, including a first filtered data set, by filtering the processed data, wherein each of the filtered data sets corresponds to a different bandpass filter;
a computation module configured to calculate an autocorrelation function (ACF) for the first filtered data set across a set of values of tau, wherein the spacing between each consecutive pair of values of tau increases geometrically;
a local maxima extraction module configured to:
split the ACF into segments using a threshold function, wherein each segment of the segments has (i) endpoints at points where the ACF is equal to the threshold function and (ii) at all other points the ACF is greater than the threshold function; and
identify, for each segment of the segments, a global maximum of the segment as a local maximum of the ACF;
a clustering module configured to:
calculate a difference in tau between each consecutive pair of local maxima;
identify clusters of the differences; and
count occurrences of the differences in each cluster;
a period determination module configured to:
identify which of the clusters has a highest occurrence count;
compare the highest occurrence count to a threshold;
in response to the highest occurrence count exceeding the threshold, indicate that the difference corresponding to the highest occurrence count is a significant period; and
in response to the highest occurrence count failing to exceed the threshold, indicate that no significant period is present;
an output device configured to output the periodicity profile based on (i) the significant period and (ii) significant periods for others of the plurality of filtered data sets;
a normal behavior characterization module configured to generate a baseline profile indicating normal behavior of the first metric based on the time series of values and the periodicity profile;
an anomaly behavior characterization module configured to (i) analyze a plurality of prior anomalies present in the time series of values and (ii) develop an anomaly model of the first metric based on the analysis of the prior anomalies;

an anomaly identification module configured to selectively identify an anomaly in present values of the first metric in response to the present values deviating outside the baseline profile;

an anomaly scoring module configured to determine a first score for the identified anomaly based on (i) characteristics of the identified anomaly, (ii) the anomaly model, and (iii) data of contemporary anomalies for metrics other than the first metric; and an alert module configured to, in response to the first score exceeding a threshold, generate an alert message and transmit the alert message to a designated user over a network interface.

11. The processing system of claim 10 wherein the computing system performance is one of processor usage, memory usage, execution time, simultaneous connections, and network latency.

12. The processing system of claim 10 wherein the anomaly behavior characterization module is configured to:
  distinguish, based on user feedback, at least one of (i) anomalies representing false positives and (ii) anomalies representing true positives; and
  at least one of (i) decrease contributions to the anomaly model from anomalies representing true positives compared to other anomalies and (ii) increase contributions to the anomaly model from anomalies representing false positives compared to other anomalies.

13. A method of recognizing an anomaly in time series data, the method comprising:
  receiving a time series of values of a first metric, wherein the first metric corresponds to a measurement of computing system performance;
  calculating an autocorrelation function (ACF) based on the time series of values across a set of values of tau, wherein the spacing between each consecutive pair of values in the set of values of tau increases as tau increases;
  identifying local maxima of the calculated ACF;
  determining a significant period based on spacing between the local maxima;
  selectively outputting the significant period as a periodicity profile;
  generating a baseline profile indicating normal behavior of the first metric based on the time series of values and the periodicity profile;
  selectively identifying an anomaly in present values of the first metric in response to the present values deviating outside the baseline profile;
  generating an alert message in response to the identified anomaly;
  transmitting the alert message to a designated user over a network interface;
  generating a plurality of filtered data sets, wherein each of the filtered data sets corresponds to a different bandpass filter;
  for each of the plurality of filtered data sets, performing the calculating the ACF, the identifying the local maxima, and the determining the significant period; and
  outputting the periodicity profile based on a lowest significant period across the plurality of filtered data sets.

14. The method of claim 13 further comprising:
  analyzing a plurality of prior anomalies present in the time series of values;
  developing an anomaly model of the first metric based on the analysis of the prior anomalies; and
  determining a first score for the identified anomaly based on (i) characteristics of the identified anomaly and (ii) the anomaly model,
  wherein the alert message is generated only in response to the first score exceeding a threshold.

15. The method of claim 13, wherein the spacing between each consecutive pair of values of tau increases geometrically as tau increases.

16. The method of claim 13, wherein the identifying the local maxima includes:
  splitting the ACF into segments using a threshold function, wherein each segment of the segments (i) has endpoints at points where the ACF is equal to the threshold function and (ii) at all other points the ACF is greater than the threshold function; and
  identifying, for each segment of the segments, a global maximum of the segment as a local maximum of the ACF.

* * * * *